(12) United States Patent
Choi et al.

(10) Patent No.: US 6,908,706 B2
(45) Date of Patent: Jun. 21, 2005

(54) CATHODE ELECTRODE, MANUFACTURING METHOD THEREOF AND LITHIUM SULFUR BATTERY USING THE SAME

(75) Inventors: Jae-young Choi, Suwon (KR); Duck-young Yoo, Suwon (KR); Jong-ki Lee, Seoul (KR); Min-seuk Kim, Seoul (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 219 days.

(21) Appl. No.: 10/259,293

(22) Filed: Sep. 30, 2002

(65) Prior Publication Data

US 2003/0113627 A1 Jun. 19, 2003

(30) Foreign Application Priority Data

Dec. 18, 2001 (KR) .......................................... 2001-80906

(51) Int. Cl.[7] .............................................. H01M 4/58
(52) U.S. Cl. ................... 429/218.1; 429/217; 429/232; 429/231.95; 429/233; 427/58; 427/122
(58) Field of Search ........................... 429/233, 231.95, 429/218.1, 217, 232; 427/58, 122

(56) References Cited

U.S. PATENT DOCUMENTS

| | | | |
|---|---|---|---|
| 5,523,179 A | 6/1996 | Chu | 429/104 |
| 5,532,077 A | 7/1996 | Chu | 429/102 |
| 5,582,623 A | 12/1996 | Chu | 29/623.1 |
| 5,961,672 A | 10/1999 | Skotheim et al. | |
| 6,110,619 A | 8/2000 | Zhang et al. | |
| 6,153,337 A | 11/2000 | Carlson et al. | |
| 6,406,814 B1 * | 6/2002 | Gorkovenko et al. | 429/218.1 |
| 2002/0192557 A1 * | 12/2002 | Choi et al. | 429/232 |

FOREIGN PATENT DOCUMENTS

| | | |
|---|---|---|
| JP | 05-266891 | 10/1993 |
| JP | 06-168721 | 6/1994 |
| JP | 2002-319400 | 10/2002 |
| WO | 99/33125 | 7/1999 |
| WO | 99/33127 | 7/1999 |

* cited by examiner

*Primary Examiner*—Laura Weiner
(74) *Attorney, Agent, or Firm*—Lee & Morse, P.C.

(57) ABSTRACT

Provided is a cathode electrode including a current collector, and a cathode electrode active material layer laminated on the current collector, a method of making the cathode electrode, and a battery including the cathode electrode. The cathode electrode active material includes particles having a core-shell structure with a sulfur-containing active material core, a conductor coating disposed on a surface of the active material core, and a binder coating disposed on the conductor coating. A high-performance lithium sulfur battery can be manufactured using the cathode electrode, since sufficient bondability can be attained with only a small amount of a binder.

19 Claims, 4 Drawing Sheets

CATHODE ELECTRODE, MANUFACTURING METHOD THEREOF AND LITHIUM SULFUR BATTERY USING THE SAME

BACKGROUND OF THE INVENTION

1. Field of the Invention

The present invention relates to a cathode electrode, to a method of manufacturing the cathode electrode, and to a lithium sulfur battery using the same. More particularly, the present invention relates to a cathode electrode in which the amount of a binder used in the cathode active material composition, which also includes sulfur or polysulfide as the cathode active material, is reduced. The invention also relates to a method of manufacturing such a cathode, and to a lithium sulfur battery using the same.

2. Description of the Related Art

With the increasing demand in recent times for miniaturized, lightweight portable electronic devices such as cellular phones, notebook type computers, camcorders and the like, there is a concomitant increase in demand for a lithium secondary battery as power sources for such devices, whereby the battery can realize a smaller size, is lightweight, and has a large capacity. Various materials can be used as active materials for secondary batteries, and conventional lithium ion batteries and lithium polymer batteries typically use a lithium metal compound, e.g., $LiCoO_2$, as a cathode active material, and either crystalline or non-crystalline carbon as an anode active material.

The theoretical capacity of $LiCoO_2$ as a cathode active material is only 274 mAh/g, and the theoretical capacity of carbon as an anode active material is only 372 mAh/g. Although batteries have been smaller and lighter along with the advancement of battery manufacturing technologies, realization of small, lightweight batteries typically is defined by theoretical capacities of cathode and anode active materials.

Lithium sulfur secondary batteries that use sulfur as a cathode active material, on the other hand, have a theoretical capacity of 1680 mAh/g for the cathode, and a lithium metal having a theoretical capacity of 3860 mAh/g as an anode active material. These batteries have a very large energy density, when compared to conventional lithium ion batteries and lithium polymer batteries, and have a potential in manufacturing small, lightweight batteries that are in increasing demand today.

In lithium sulfur batteries, the oxidation/reduction reaction between lithium and sulfur can be expressed by the following reaction scheme. It is known that the reaction capacity of sulfur that can be practically used in a lithium secondary battery is only a half a theoretical capacity, that is, approximately 840 mAh/g due to irreversible reaction characteristics of polysulfide.

2Li+$S_8$ (solid)⇌$Li_2S_8$ (solution)

2Li+$Li_2S_8$ (solution)⇌2$Li_2S_4$ (solution)

2Li+$Li_2S_4$ (solution)⇌2$Li_2S_2$ (solution)

2Li+$Li_2S_2$ (solution)⇌2$Li_2S$ (solid precipitate)

As seen from the above reaction schemes, in the oxidation/reduction reaction between sulfur and lithium, a new reaction product, that is, lithium polysulfide, is generated. It is known that sulfur and lithium polysulfide participating in the above reactions have very low electrical conductivity. In order to promote an electrochemical reaction, it is necessary for active materials to contact the surface of a conductive reaction site. Also, in order to promote the supply of electrochemical reaction sites, it is necessary to obtain a sufficient reaction surface area by using a large amount of a conductive agent.

In conventional lithium ion batteries and lithium polymer batteries, the oxidation/reduction reaction is an intercalation reaction in which lithium ions move into/from a laminate structure of $LiCoO_2$. In such an intercalation reaction, since the electric conductivity of $LiCoO_2$ is still low, a conductive agent is required to increase the conductivity of the cathode. Since the cathode active material $LiCoO_2$ acts as a reaction site, only a minimum amount of a conductive agent required for increasing the conductivity of a cathode electrode, is necessary.

Accordingly, a larger amount of a conductive agent is used for a cathode in a lithium sulfur battery, when compared to a lithium ion battery or lithium polymer battery. For example, U.S. Pat. No. 5,961,672-4, WO 33125-3, WO 33125-4, WO 33127-2 and WO 33127-3, the disclosures of which are incorporated by reference herein in their entirety, describe that as much as 10 to 30% by weight of a conductive agent is used.

Increasing the amount of a conductive agent unavoidably involves an increase in the amount of binder used so as to prevent bondability of a cathode plate from lowering. This results in a reduction of the concentration of a cathode active material in a cathode active material layer including a conductive agent and a binder in addition to the cathode active material, which may, in turn, become an impediment to the manufacture of high-performance cathode electrodes.

The description herein of certain disadvantages of the known batteries, methods, and apparatus is in no way intended to limit the scope of the invention. Indeed, certain aspects of the present invention may include various features of the known batteries, methods, and apparatus without suffering from the disadvantages described herein.

SUMMARY OF THE INVENTION

To solve the above-described problems, and other problems readily apparent to those skilled in the art, the present invention provides a cathode electrode that can reduce the amount of a binder used in a cathode electrode that employs sulfur as the active material. In addition, the present invention provides a method of manufacturing the cathode electrode. Further still, the present invention provides a lithium battery employing the cathode electrode.

In one aspect of an embodiment of the present invention, there is provided a cathode electrode including a current collector, and a cathode electrode active material layer laminated on the current collector. The cathode electrode material includes particles having a core-shell structure, whereby the particles comprise a sulfur-containing active material core, a conductor coating disposed on a surface of the active material core, and a binder coating disposed on the conductor coating.

According to another aspect of an embodiment of the present invention, there is provided a method for manufacturing a cathode electrode including (a) mixing 2 to 100 parts by weight of a sulfur-containing cathode active material, 1 to 50 parts by weight of a conductive material with 20 to 100 parts by weight of a solvent and milling to prepare primary particles of the cathode active material including a cathode active material core and a conductor coating disposed on the cathode active material core, and (b) mixing a binder solution having 0.1 to 50 parts by weight of a binder dissolved in 1 to 99.9 parts by weight of a solvent, with the primary particles of the cathode active material and milling to prepare a slurry of secondary particles of the cathode active material including a binder coating.

According to still another aspect of the present invention, there is provided a lithium sulfur battery including the cathode electrode. By using the cathode electrode according to the present invention, sufficient bondability can be achieved while reducing the amount of binder used. Thus, in a lithium sulfur battery employing the cathode electrode, a large amount of an active material is contained in a cathode active material layer, thereby preparing a high-performance cathode electrode.

BRIEF DESCRIPTION OF THE DRAWINGS

The above objects and advantages of the present invention will become more apparent by describing in detail exemplary embodiments thereof with reference to the attached drawings in which.

DETAILED DESCRIPTION OF THE INVENTION

Korean Priority Application No. 2001-80906, filed on Dec. 18, 2001, entitled: "Cathode Electrode, Manufacturing Method Thereof, and Lithium Sulfur Battery Using the Same," is incorporated by reference herein in its entirety.

A cathode electrode according to the present invention now will be described by comparison to a conventional cathode electrode. It is to be understood in the present invention that not all of the cathode active material particles have the same core-shell structure containing identical proportions of components. For example, one particle may have more sulfur or sulfur-containing active material in the core than another particle, or the conductor coating may be thicker on one particle when compared to another. In addition, not every single particle will have the claimed core shell structure, so long as the desirable features of the invention are achieved. It is preferred that at least 40% by weight of the particles have a core shell structure, more preferably at least 50%, even more preferably at least 75%, even more preferably at least 85%, and more preferably more than 95% of the particles have a core shell structure. It is most preferred that more than 99% and even 100% of the particles have a core shell structure.

Figure 1:
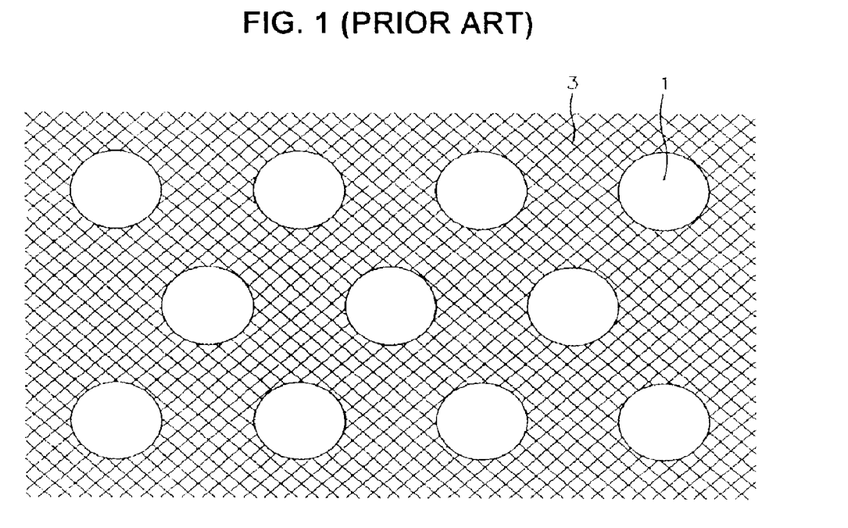
FIG. 1 is a diagram showing the structure of an active material layer of a conventional cathode electrode.

Turning now to the Figures, a conventional cathode electrode will be described briefly. FIG. 1 is a diagram showing the structure of an active material layer of a conventional cathode electrode. Referring to FIG. 1, the active material layer of a conventional cathode electrode includes an active material, a conductive agent and a binder homogenously mixed therewith. In more detail, the surfaces of a sulfur or polysulfide active material particle 1 are present in a discontinuous phase, and are coated with a mixture 3 of electrical conductor particles or ionic conductor particles and a binder, the mixture 3 being in a continuous phase. In this case, in order to secure a strong bondability of a cathode plate itself or between a cathode active material layer and the cathode plate, it is necessary to coat the active material particles and the conductor particles with the binder.

Figure 2:
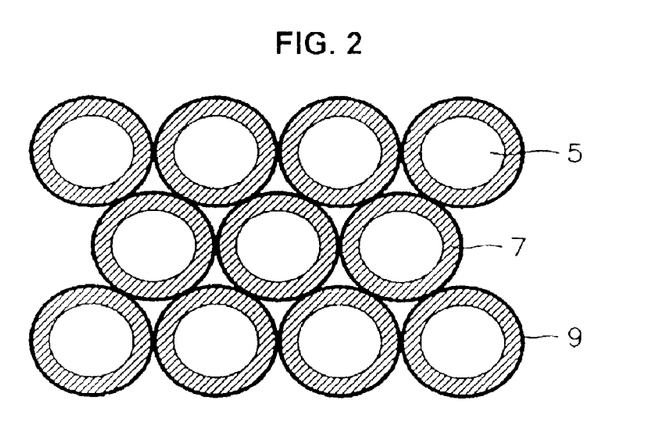
FIG. 2 is a diagram showing the structure of an active material layer of a cathode electrode according to the present invention.

FIG. 2 is a diagram showing the preferred structure of an active material layer of a cathode electrode according to the present invention. Referring to FIG. 2, the active material layer of a cathode electrode according to the present invention is constructed of particles having a core-shell structure, in which a core 5 is coated with a conductor particle layer 7 and the conductor particle layer 7 is coated with a binder layer 9. The core preferably includes sulfur or polysulfide active material particles 5. Thus, since the binder layer 9 has only to coat the surface of the conductor particle layer 7 coated on the surface of the active material core 5, only a small amount of a binder is necessary to obtain the same bondability as in the conventional active material layer (FIG. 1) in which all active material particles and conductor particles are coated with the binder. As a result, since bondability can be secured by use of a small amount of a binder, the content of an active material in the cathode active material layer can be increased, thereby manufacturing a high-performance cathode plate.

In one aspect of an embodiment of the present invention, there is provided a cathode electrode including a current collector, and a cathode electrode active material layer laminated on the current collector. The cathode electrode material includes particles having a core-shell structure, whereby the particles comprise a sulfur-containing active material core, a conductor coating disposed on a surface of the active material core, and a binder coating disposed on the conductor coating.

Preferably, each of the particles having a core-shell structure is mechanically and electrically connected with the current collector and adjacent particles having a core-shell structure. The conductor coating preferably may include particles having electron conductivity or a polymer having lithium-ion conductivity, more preferably, carbon powder. The binder coating may include at least one binder selected from the group consisting of polyethylene oxide, polyvinylidene fluoride, a copolymer of vinylidene fluoride and hexafluoropropylene, a mixture of polyvinylidene fluoride and styrene-butadiene rubber, and mixtures and combinations thereof.

The content of the sulfur-containing active material core is in the range of approximately 70% to approximately 95% by weight, based on the weight of the cathode active material layer. If the content of the sulfur-containing active material core is less than 70% by weight, the energy capacity per weight of a cathode may be undesirably reduced. If the content of the sulfur-containing active material core is greater than 95% by weight, the contents of the conductor coating and the binder coating may be reduced, thereby resulting in poor conductivity and bondability of the cathode active material.

In the manufacture of electrode plates, bondability between components of an active material layer and between the active material layer and a current collector is an important factor from the viewpoint of battery performance. If bondability between an active material layer and a current collector is decreased, stripping may occur there between during charging and discharging cycles of a battery, resulting in deterioration of battery performance. However, the cathode electrode according to the present invention can effectively address the problem, thus resulting in the manufacture of a lithium sulfur battery having good cycle characteristics.

As shown in FIGS. 1 and 2, since the cathode active material layer according to the present invention has pores larger than those of the conventional cathode active material layer, it has a good electrolyte-absorbing property. Also, since the cathode electrode according to the present invention has a much smaller surface area of a conductive agent coated with a binder than the conventional cathode plate, any reduction in conductive performance due to the presence of large amounts of binder can be suppressed, while sites for the oxidation/reduction reaction of active materials can effectively be provided.

According to another aspect of an embodiment of the present invention, there is provided a method for manufacturing a cathode electrode including (a) mixing 2 to 100 parts by weight of a sulfur-containing cathode active material, 1 to 50 parts by weight of a conductive material with 20 to 100 parts by weight of a solvent and milling to prepare primary particles of the cathode active material including a cathode active material core and a conductor coating disposed on the cathode active material core, and (b) mixing a binder solution having 0.1 to 50 parts by weight of a binder dissolved in 1 to 99.9 parts by weight of a solvent, with the primary particles of the cathode active material and milling to prepare a slurry of secondary particles of the cathode active material including a binder coating.

The method preferably may further include coating a current collector with the slurry to a thickness of 10 to 500 μm, after preparing the slurry. In addition, the primary particles preferably include particles having electron conductivity or a polymer having lithium-ion conductivity, more preferably carbon powder.

The binder coating may include at least one binder selected from the group consisting of polyethylene oxide, polyvinylidene fluoride, a copolymer of vinylidene fluoride and hexafluoropropylene, a mixture of polyvinylidene fluoride and styrene-butadiene rubber, and mixtures and combinations thereof. The solvents used in the method preferably are at least one selected from the group consisting of N-methyl-2-pyrrolidone (NMP), tetrahydrofuran (THF) and acetonitrile. It is preferred that the same solvent be used to prepare the primary particles and to prepare the binder solution.

A cathode electrode according to the present invention and a method for manufacturing a lithium sulfur battery employing the cathode electrode will now be described in detail with reference to the following embodiments. However, it should be appreciated that numerous alterations and modifications insofar as they come within the scope of the invention as claimed or the equivalents thereof, can be practiced by those skilled in the art, without departing from the spirit and scope of the invention.

Preparation of Cathode Electrode

EXAMPLE 1

A cathode electrode including a cathode active material layer containing particles having a core-shell structure in which a sulfur active material core, a carbon conductive agent for a first coating and a binder for a second coating were mixed in a ratio by weight of 70:20:10 (see FIG. 2), was prepared as follows.

450 g of zirconia ($ZrO_2$) balls having a diameter of 5 mm were placed into a 250 mL high-density polyethylene (HDPE) container and mixed with 7 g of sulfur, 2.0 g of carbon (Super-P) and 66 g of an acetonitrile solvent. The resultant mixture was milled at 200 rpm for 24 hours, thereby preparing particles in which the surfaces of sulfur active material particles were coated with carbon particles.

Figure 3:
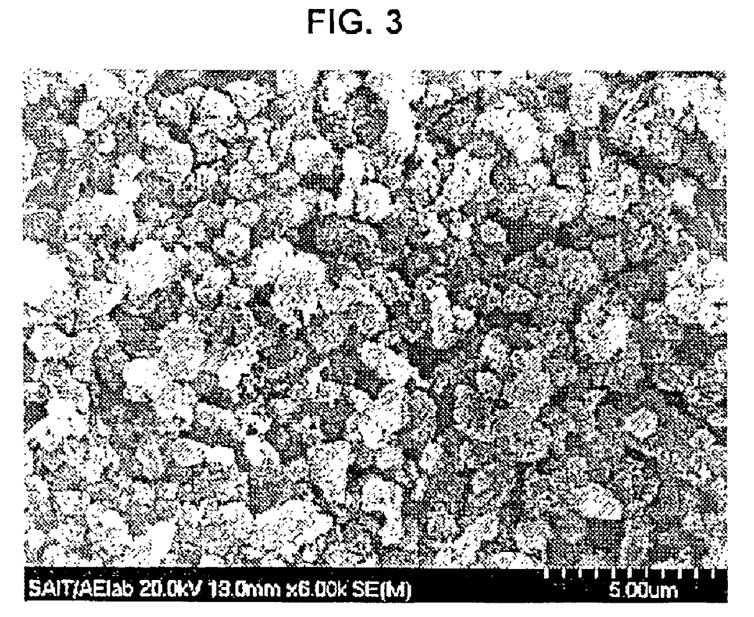
FIG. 3 shows a scanning electron microscope (SEM) photograph depicting sulfur particles the surfaces of which are coated with carbon particles as a conductive agent prepared by Example 1 of the present invention.
Figure 4:
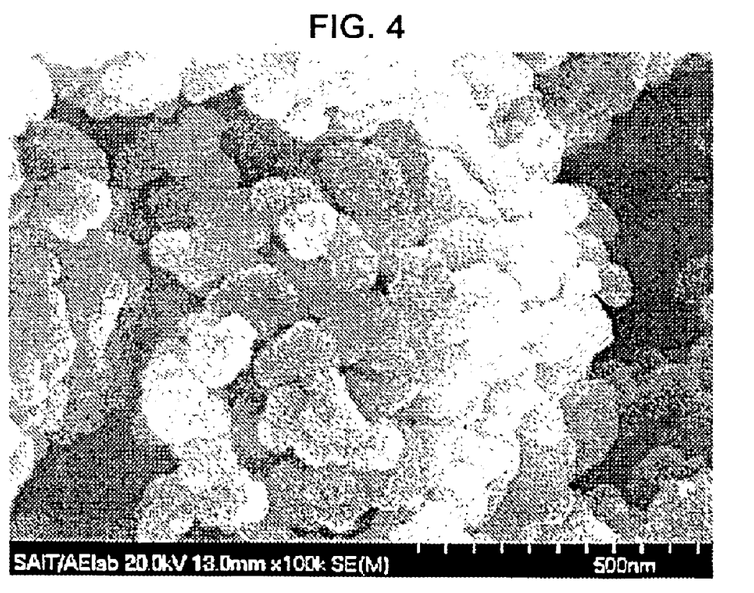
FIG. 4 is an enlarged SEM photograph of FIG. 3.

FIG. 3 shows a scanning electron microscope (SEM) photograph depicting sulfur particles the surfaces of which are coated with carbon particles as a conductive agent prepared by Example 1 of the present invention, and FIG. 4 is an enlarged SEM photograph of FIG. 3. Referring to FIGS. 3 and 4, the surfaces of sulfur active material particles were coated with carbon particles of approximately 50 nm in diameter. Then, 16.7 g of a binder solution was added to a slurry of the sulfur active material particles coated with the carbon particles and milled at 50 rpm for 1 hour, followed by coating again with the binder solution. The binder solution was synthesized by dissolving 6% by weight of polyethyleneoxide (PEO) having a weight average molecular weight of 4,000,000 in an acetonitrile solvent.

Subsequently, the cathode active material slurry was applied on an aluminum (Al) base (Rexam) coated with carbon, using a doctor blade, to such a thickness that assuming that the capacity of sulfur is 840 mAh/g, the loading density of a cathode electrode becomes 2.0 mAh/$cm^2$, followed by drying at 80° C. for 24 hours. The resultant product was rolled and cut into a predetermined dimension, thereby preparing a cathode electrode.

Figure 5:
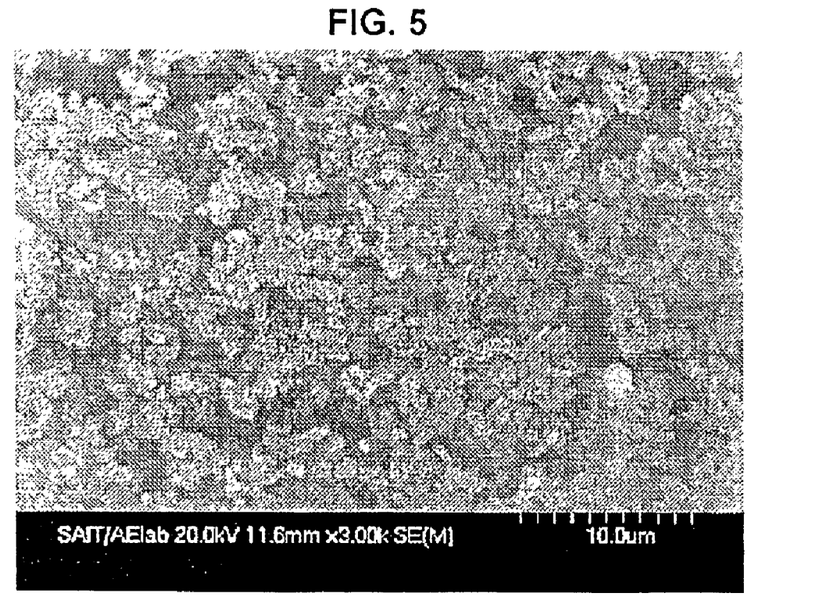
FIG. 5 shows a SEM photograph depicting the structure of a cathode active material layer of a cathode electrode prepared by Example 1 of the present invention.

FIG. 5 shows a SEM photograph depicting the structure of a cathode active material layer of the thus-prepared cathode electrode. Referring to FIG. 5, particles of the slurry have a core-shell structure. The obtained cathode electrode was cut into a size of 1.5×2.0 in centimeters and bondability tests were carried out according to a method to be described in Example 5.

EXAMPLE 2

A cathode electrode was prepared in the same manner as in Example 1, except that the mixing ratio by weight of a sulfur active material core, a carbon conductive agent for a first coating and a binder for a second coating was adjusted to 70:20:5 and 8.4 g of a binder solution was used.

Thereafter, the obtained cathode electrode was cut into a size of 1.5×2.0 in centimeters and bondability tests were carried out according to a method to be described in Example 5.

EXAMPLE 3

A cathode electrode was prepared in the same manner as in Example 1, except that the mixing ratio by weight of a sulfur active material core, a carbon conductive agent for a first coating and a binder for a second coating was adjusted to 70:20:3 and 5.0 g of a binder solution was used.

Thereafter, the obtained cathode electrode was cut into a size of 1.5×2.0 in centimeters and bondability tests were carried out according to a method to be described in Example 5.

EXAMPLE 4

A cathode electrode was prepared in the same manner as in Example 1, except that the mixing ratio by weight of a sulfur active material core, a carbon conductive agent for a first coating and a binder for a second coating was adjusted to 70:20:1 and 1.7 g of a binder solution was used.

Thereafter, the obtained cathode electrode was cut into a size of 1.5×2.0 in centimeters and bondability tests were carried out according to a method to be described in Example 5.

Bondability Test

EXAMPLE 5

The cathode electrodes prepared in Examples 1-4 were placed into an electrolyte solution, allowed to stand for 10 minutes, and then observed whether they were stripped or not, thereby testing their bondability. Here, an electrolyte solution having 1.0 M $LiPF_6$ dissolved in a mixed solvent of dioxolane (DOX), diglyme (DGM), dimethoxyethane (DEC) and sulfolane (SUL) mixed in a ratio by volume of 5:2:2:1, was used as the electrolyte solution.

Table 1 summarizes the bondability test results.

TABLE 1

|  | Example 1 | Example 2 | Example 3 | Example 4 |
|---|---|---|---|---|
| Composition ratio of Sulfur/carbon/binder (wt) | 70/20/10 | 70/20/5 | 70/20/3 | 70/20/1 |
| Content of sulfur (g) | 7 | 7 | 7 | 7 |
| Content of carbon (g) | 2.0 | 2.0 | 2.0 | 2.0 |
| Amount of solvent 1 used (g) | 66 | 66 | 66 | 66 |
| Amount of 6 wt % binder solution used (g) | 16.7 | 8.4 | 5.0 | 1.7 |
| Bondability | Not stripped | Not stripped | Not stripped | Not stripped |

Referring to Table 1, none of the cathode electrodes prepared in Examples 1-4 was stripped, irrespective of the compositional ratio.

Preparation of Cathode Electrode

COMPARATIVE EXAMPLE 1

A cathode electrode including a conventional cathode active material layer in which a sulfur active material, a carbon conductive agent and a binder are mixed in a ratio by weight of 70:20:10 (see FIG. 1), was prepared as follows.

400 g of zirconia ($ZrO_2$) balls having a diameter of 5 mm were placed into a 250 mL HDPE container and mixed with 7 g of sulfur and 31 g of acetonitrile (solvent 1 of Table 2). The resultant mixture was milled at 200 rpm for 24 hours, thereby preparing a sulfur slurry.

Separately from the above, 2.0 g of carbon (Super-P), 16.7 g of a binder solution and 35 g of acetonitrile (solvent 2 of Table 2) were placed into a 250 mL HDPE container and stirred for mixing. The resultant mixture was milled at 50 rpm for 24 hours, thereby preparing a carbon slurry. The binder solution was synthesized by dissolving 6% by weight of polyethyleneoxide (PEO) having a weight average molecular weight of 4,000,000 in an acetonitrile solvent.

Subsequently, the sulfur slurry and the carbon slurry were mixed and milled at 50 rpm for 24 hours, thereby preparing a cathode active material slurry having sulfur slurry and carbon slurry homogenously mixed.

The cathode active material slurry was applied on an aluminum (Al) base (Rexam) coated with carbon, using a doctor blade, to such a thickness that assuming that the capacity of sulfur is 840 mAh/g, the loading density of a cathode electrode becomes 2.0 $mAh/cm^2$, followed by drying at 80° C. for 24 hours. The resultant product was rolled and cut into a predetermined dimension, thereby preparing a cathode electrode.

Figure 6:
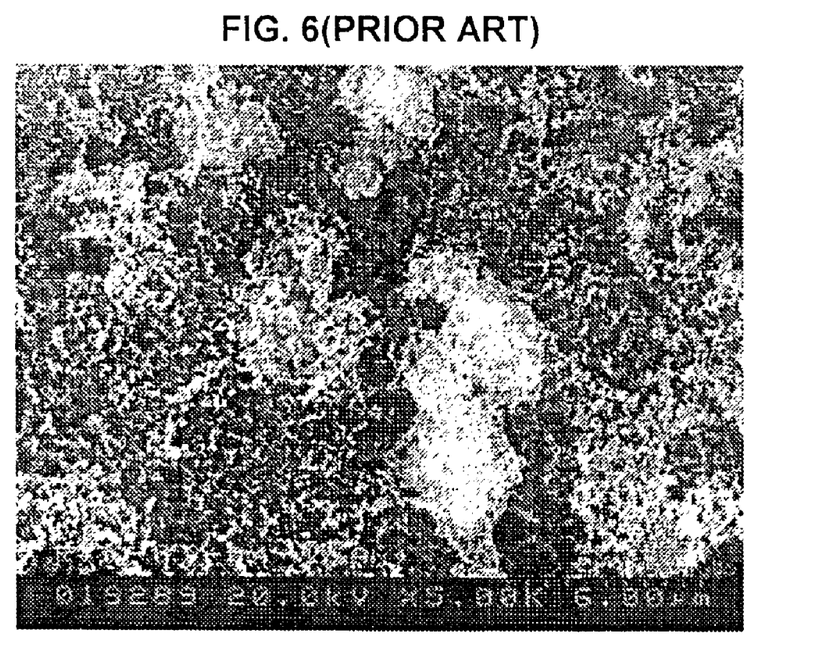
FIG. 6 shows a SEM photograph depicting the structure of a cathode active material layer of a cathode electrode prepared by Comparative Example 1.

FIG. 6 shows a SEM photograph depicting the structure of a cathode active material layer of the thus-prepared cathode electrode. Referring to FIG. 6, sulfur particles are homogenously distributed among carbon particles. The obtained cathode electrode was cut into a size of 1.5×2.0 in centimeters and bondability tests were carried out according to the method described in Comparative Example 5 below.

COMPARATIVE EXAMPLE 2

A cathode electrode was prepared in the same manner as in Comparative Example 1, except that the mixing ratio by weight of a sulfur active material, a carbon conductive agent and a binder was adjusted to 70:20:5, and 8.4 g of a binder solution was used.

Thereafter, the obtained cathode electrode was cut into a size of 1.5×2.0 in centimeters and bondability tests were carried out according to a method described below in Comparative Example 5.

COMPARATIVE EXAMPLE 3

A cathode electrode was prepared in the same manner as in Comparative Example 1, except that the mixing ratio by weight of a sulfur active material, a carbon conductive agent and a binder was adjusted to 70:20:3, and 5.0 g of a binder solution was used.

Thereafter, the obtained cathode electrode was cut into a size of 1.5×2.0 in centimeters and bondability tests were carried out according to a method described in Comparative Example 5 below.

COMPARATIVE EXAMPLE 4

A cathode electrode was prepared in the same manner as in Comparative Example 1, except that the mixing ratio by weight of a sulfur active material, a carbon conductive agent and a binder was adjusted to 70:20:1, and 1.7 g of a binder solution was used.

Thereafter, the obtained cathode electrode was cut into a size of 1.5×2.0 in centimeters and bondability tests were carried out according to a method described below in Comparative Example 5.

Bondability Test

COMPARATIVE EXAMPLE 5

The cathode electrodes prepared in Comparative Examples 1–4 were placed into an electrolyte solution having the same composition as that of Example 5, allowed to stand for 10 minutes, and then observed whether they were stripped or not, thereby testing their bondability.

Table 2 summarizes the bondability test results.

TABLE 2

|  | Comparative Example 1 | Comparative Example 2 | Comparative Example 3 | Comparative Example 4 |
|---|---|---|---|---|
| Composition ratio of Sulfur/carbon/binder (wt) | 70/20/10 | 70/20/5 | 70/20/3 | 70/20/1 |
| Content of sulfur (g) | 7 | 7 | 7 | 7 |
| Amount of solvent 1 used (g) | 31 | 31 | 31 | 31 |
| Content of carbon (g) | 2.0 | 2.0 | 2.0 | 2.0 |
| Amount of solvent 2 used (g) | 35 | 35 | 35 | 35 |
| Amount of 6 wt % binder solution used (g) | 16.7 | 8.4 | 5.0 | 1.7 |
| Bondability | Not stripped | Stripped | Stripped | Stripped |

Referring to Table 2, while the cathode electrode prepared in Comparative Example 1, in which the mixing ratio by weight of a sulfur active material, a carbon conductive agent and a binder was 70:20:10, was not stripped, the cathode electrodes prepared in Comparative Examples 2–4, in which the mixing ratios were 70:20:5, 70:20:3 and 70:20:1, respectively, were stripped.

Preparation of Lithium Sulfur Battery

EXAMPLE 6

A 25 μm thick polyethylene separator (available from Cellgard Co.) was interposed between the cathode electrode prepared in Example 3 and an anode plate fabricated by cutting a lithium metal plate into a predetermined size, and the resultant product was assembled into a pouch-type lithium battery cell. An organic electrolyte solution was injected into the pouch and sealed, thereby completing a lithium sulfur battery. Here, 100 mg of an electrolyte solution having 1.0 M $LiSO_3CF_3$ dissolved in a mixed solvent of dioxolane (DOX), diglyme (DGM), dimethoxyethane (DEC) and sulfolane (SUL) mixed in a ratio by volume of 5:2:2:1, was used as the organic electrolyte solution.

The thus-fabricated lithium sulfur battery was allowed to stand for 3 hours, subjected to discharging and charging each once at 0.25 C within the potential range of 1.5 to 2.8 V, and then a cycling test was performed thereon. During charging, a cut-off condition of 150% the capacity as designed was additionally set.

Figure 7:
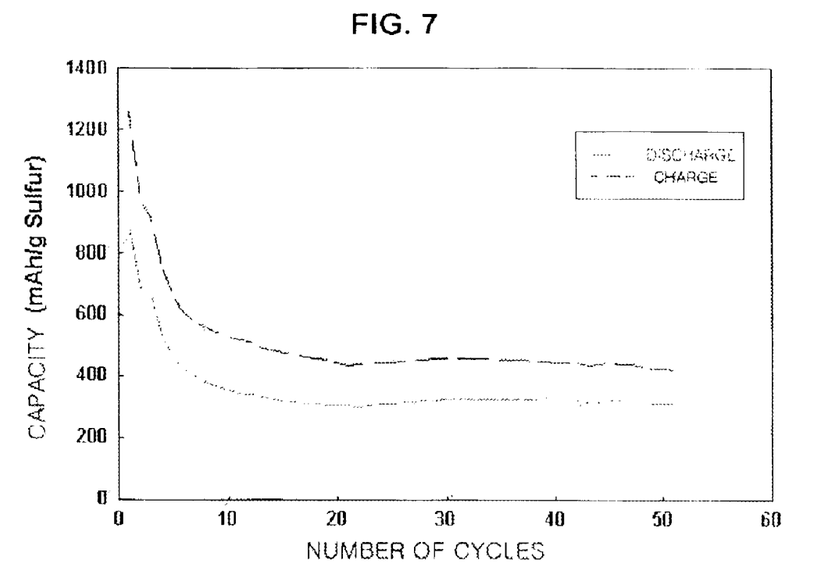
FIG. 7 represents cycle characteristics of a lithium sulfur battery prepared by Example 6 of the present invention.

FIG. 7 represents cycle characteristics of the lithium sulfur battery prepared by Example 6 of the present invention. Referring to FIG. 7, bondability of the cathode electrode is so good that there is no sharp decrease in charge or discharge capacity even after 50 cycles, unlike in the case shown in FIG. 8.

COMPARATIVE EXAMPLE 6

A pouch-type lithium sulfur battery was fabricated in the same manner as in Example 6, except that the cathode electrode prepared in Comparative Example 3 was used. The lithium sulfur battery was subjected to cycling test under the same conditions as in Example 6.

Figure 8:
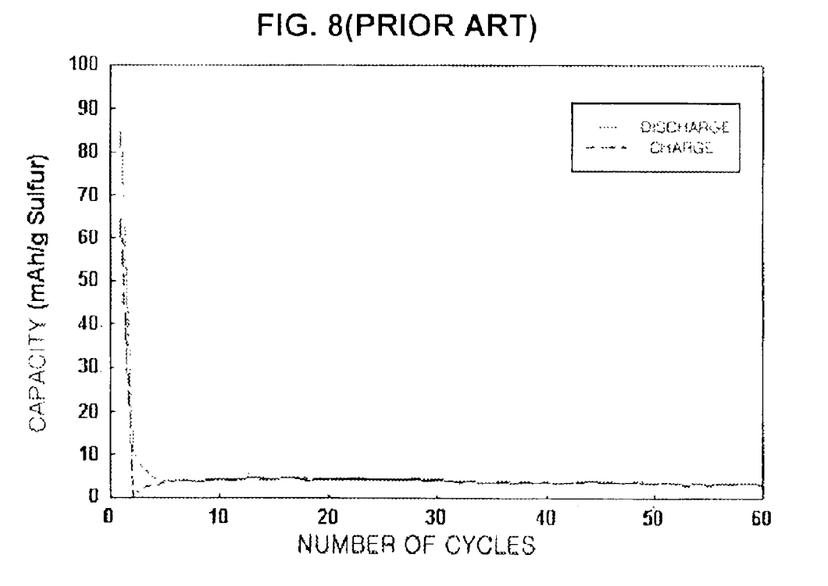
FIG. 8 represents cycle characteristics of a lithium sulfur battery prepared by Comparative Example 6.

FIG. 8 represents cycle characteristics of the lithium sulfur battery prepared by Comparative Example 6. Referring to FIG. 8, bondability of the cathode electrode is poor, resulting in a sharp decrease in charge and discharge capacities during and after the second cycles, unlike in the case shown in FIG. 7.

As described above, use of the cathode electrode according to the present invention can achieve sufficient bondability while reducing the amount of binder used. Thus, in a lithium sulfur battery employing the cathode electrode, a large amount of an active material is contained in a cathode active material layer, thereby preparing a high-performance cathode electrode.

In other words, the active material layer of the cathode electrode according to the present invention includes active material particles having a core-shell structure. Since the active material particles are sequentially coated with a conductor layer and a binder layer, only the surface of the conductor layer is coated with the binder. As a result, a smaller amount of the binder is required to achieve the same level of bondability, when compared to the conventional cathode active material layer in which the binder is applied on both of the active material particles and the conductor particles. Since sufficient bondability of a cathode active material layer can be attained with a small amount of a binder, the content of an active material in the cathode active material layer can be increased, thereby manufacturing a high-performance cathode electrode.

Also, as understood from FIGS. 1 and 2, the cathode active material layer according to the present invention has pores larger than those of the conventional cathode active material layer. Thus, the cathode active material layer according to the present invention has an improved electrolyte-absorbing property compared to the conventional cathode active material layer. Also, since the cathode electrode according to the present invention has a much smaller surface area of a conductive agent coated with a binder than the conventional cathode plate, a reduction in conductive performance due to the presence of a binder can be suppressed and sites for the oxidation/reduction reaction of active materials can effectively be provided.

What is claimed is:

1. A cathode electrode, comprising:
    a current collector; and
    a cathode electrode active material layer laminated on the current collector, the cathode electrode active material including particles having a core-shell structure with a sulfur-containing active material core, a conductive shell of a conductive material around the sulfur-containing active material core, and a binder shell of a binder material around the conductive shell.

2. The cathode electrode of claim 1, wherein the particles having the core-shell structure are mechanically and electrically connected with the current collector and adjacent particles having a core-shell structure.

3. The cathode electrode of claim 1, wherein the conductive material includes particles selected from particles having electron conductivity or a polymer having lithium-ion conductivity.

4. The cathode electrode of claim 1, wherein the conductive material includes carbon powder.

5. The cathode electrode of claim 1, wherein the binder material comprises at least one binder selected from the group consisting of polyethylene oxide, polyvinylidene fluoride, a copolymer of vinylidene fluoride and hexafluoropropylene, a mixture of polyvinylidene fluoride and styrene-butadiene rubber, and mixtures and combinations thereof.

6. (Original) The cathode electrode of claim 1, wherein the content of the sulfur-containing active material core is within the range of from approximately 70% to approximately 95% by weight, based on the weight of the cathode active material layer.

7. A lithium sulfur battery, comprising a cathode electrode, wherein the cathode electrode includes a current collector and a cathode electrode active material layer laminated on the current collector, the cathode electrode active material including particles having a core-shell structure with a sulfur-containing active material core, a conductive shell of a conductive material around the active material core, and a binder shell of a binder material around the conductive shell.

8. The lithium sulfur battery according to claim 7, wherein the particles having the core-shell structure are mechanically and electrically connected with the current collector and adjacent particles having a core-shell structure.

9. The lithium sulfur battery according to claim 7, wherein the conductive material includes particles selected from particles having electron conductivity or a polymer having lithium-ion conductivity.

10. The lithium sulfur battery according to claim 7, wherein the conductive material includes carbon powder.

11. The lithium sulfur battery according to claim 7, wherein the binder material comprises at least one binder selected from the group consisting of polyethylene oxide, polyvinylidene fluoride, a copolymer of vinylidene fluoride and hexafluoropropylene, a mixture of polyvinylidene fluoride and styrene-butadiene rubber, and mixtures and combinations thereof.

12. (Original) The lithium sulfur battery according to claim 7, wherein the amount of the sulfur-containing active material core is within the range of from approximately 70% to approximately 95% by weight, based on the weight of the cathode active material layer.

13. A method for manufacturing a cathode electrode comprising:
(a) mixing 2 to 100 parts by weight of a sulfur-containing cathode active material, 1 to 50 parts by weight of a conductive material with 20 to 100 parts by weight of a solvent and milling to prepare primary particles of the cathode active material including a cathode active material core and a a conductive shell around the cathode active material core; and
(b) mixing a binder solution comprising 0.1 to 50 parts by weight of a binder dissolved in 1 to 99.9 parts by weight of a solvent, with the primary particles of the cathode active material and milling to prepare a slurry of secondary particles of the cathode active material including a binder shell around the conductive shell.

14. The method of claim 13, further comprising coating a current collector with the slurry of secondary particles of the cathode active material including the binder shell to a thickness of 10 to 500 $\mu$m.

15. The method of claim 13, wherein the primary particles comprise particles selected from particles having electron conductivity or a polymer having lithium-ion conductivity.

16. The method of claim 15, wherein the primary particles comprise carbon powder.

17. The method of claim 13, wherein the binder shell comprises at least one binder selected from the group consisting of polyethylene oxide, polyvinylidene fluoride, a copolymer of vinylidene fluoride and hexafluoropropylene, a mixture of polyvinylidene fluoride and styrene-butadiene rubber, and mixtures and combinations thereof.

18. The method of claim 13, wherein the solvent used in (a) and (b) are at least one selected from the group consisting of N-methyl-2-pyrrolidone (NMP), tetrahydrofuran (THF), acetonitrile, and mixtures thereof.

19. The method of claim 13, wherein the same solvent is used in both (a) and (b).

* * * * *